Aug. 21, 1934.　　　J. C. CHAPMAN　　　1,971,311
APPARATUS FOR LUBRICATING CHAINS
Filed Feb. 4, 1929　　　2 Sheets-Sheet 1

Aug. 21, 1934.  J. C. CHAPMAN  1,971,311
APPARATUS FOR LUBRICATING CHAINS
Filed Feb. 4, 1929  2 Sheets-Sheet 2
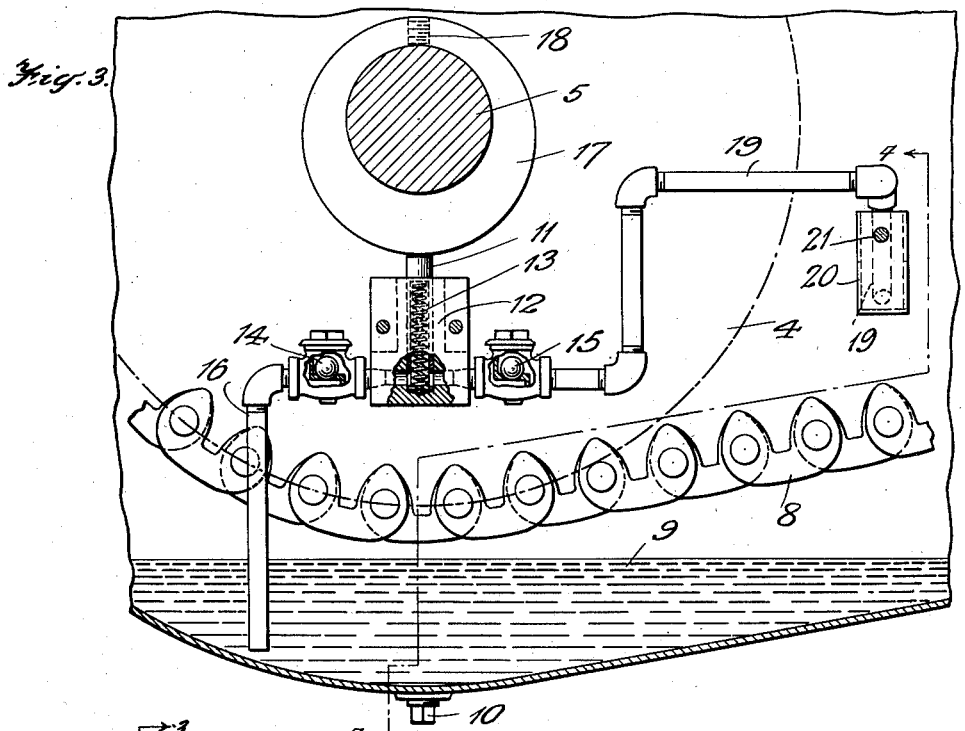
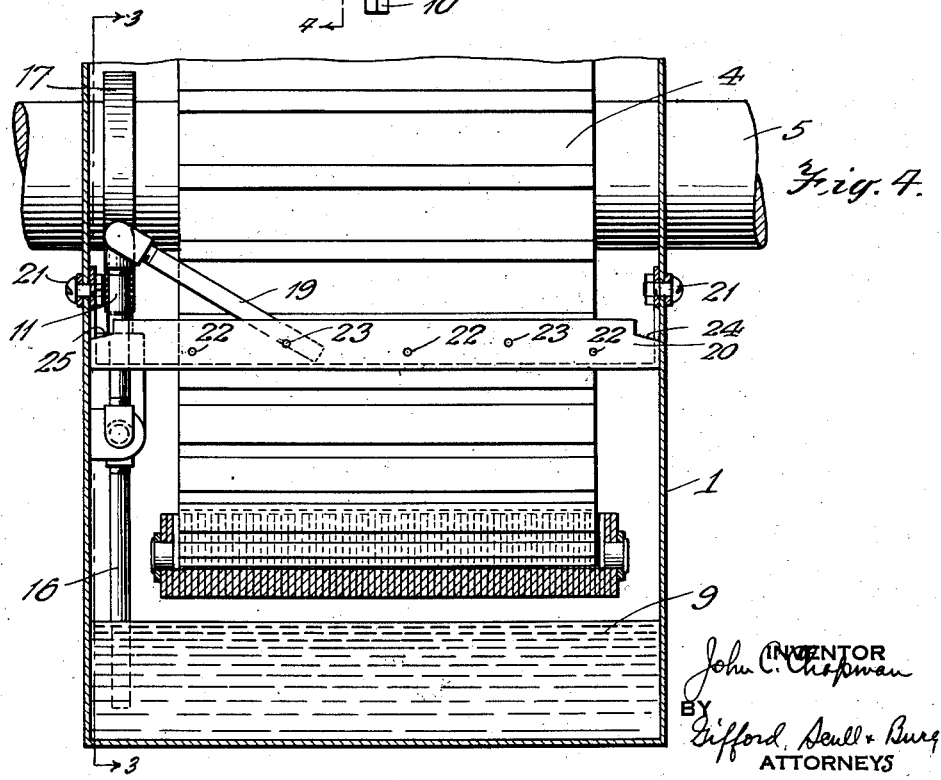

Patented Aug. 21, 1934

1,971,311

UNITED STATES PATENT OFFICE 1,971,311

APPARATUS FOR LUBRICATING CHAINS

John C. Chapman, Hartford, Conn., assignor to The Whitney Mfg. Co., Hartford, Conn., a corporation of Connecticut Application February 4, 1929, Serial No. 337,237

5 Claims. (Cl. 184—15)

My invention relates to method and apparatus for lubricating chains, particularly the lubrication of link chains of the silent type which are enclosed in a casing.

One of the objects of my invention is to lubricate a chain of the type above mentioned in such a manner that there will be ample lubrication at all times and by such means that there is practically no likelihood of a failure of the lubricating system.

Another object of my invention is to take a relatively small amount of lubricant from a relatively large supply and thereby apply to the chain fresh lubricant.

Heretofore efforts to lubricate chains of this character have not been altogether satisfactory because the circulating systems frequently get plugged up by sediment and the supply of lubricant is thereby cut off resulting in damage to the chain.

According to my invention. I forcibly circulate a relatively large amount of lubricant and utilize a portion only of the circulated lubricant to engage the chain. This prevents the possibility of plugging up the circulating system and also enables me to use a relatively high-capacity pump which insures an ample supply of lubricant to the chain.

My invention will be better understood by reading the following description in connection with the accompanying drawings illustrating one embodiment of the invention, and in which—

Fig. 3 is a partial cross section on line 3—3 of Fig. 4, showing the circulating mechanism also partly in section; and Fig. 4 is an interior view on line 4—4 of Fig. 3.

Figure 1:
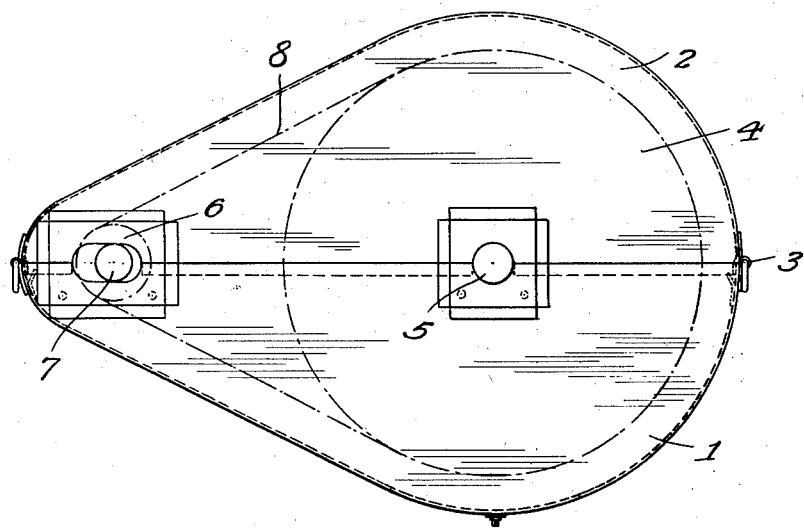
Fig. 1 is a side elevation of the device embodying my invention.
Figure 2:
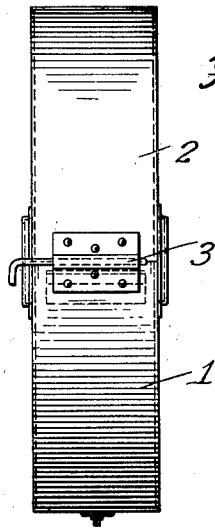
Fig. 2 is an end elevation of the device shown in Fig. 1.

Referring to the drawings, the device consists of a casing having a lower part 1 and an upper part 2 which fits into the lower part to form an oil seal. The parts 1 and 2 are hinged together at 3.

A sprocket 4 mounted on a shaft 5 and also a sprocket 6 mounted on a shaft 7 are enclosed in the casing, as is also a chain 8 which passes around these sprockets. In the lower part 1 of the casing is provided a chamber or space which contains lubricant 9, as shown in Fig. 3. A plug 10 is provided in the bottom of the part 1 which upon removal permits the lubricant to flow out of the casing.

A pump is placed inside the casing and is supported on the side walls thereof and consists of a piston 11 which works in a cylinder 12 and is normally pushed upwardly by a coil spring 13. A check valve 14 is on the inlet side of the pump and a similar valve 15 is on the outlet side of the pump. A pipe 16 extends from the check valve 14 down into the lubricant 9. An eccentric 17 is placed on the shaft 5 and held in position by a set screw 18. Leading from the pump is a pipe 19 which empties into a lubricant receiver or carrier here shown as in the form of a trough 20. The lubricant receiver or carrier 20 is supported from the side walls of part 1 of the casing by bolts 21. This receiver has openings 22 and 23 in the sides thereof, forming discharge outlets so placed as to permit the lubricant to flow out so that it may come in contact with the chain. The openings 22 are at one level and the openings 23 are at a higher level so that if sediment should get into the receiver and fill it up to the openings 22, lubricant would still be able to flow out through the openings 23.

An excess amount of lubricant is supplied to the receiver 20 through the pipe 19 and the ends of the receiver 20 are cut away at 24 and 25, to form overflow outlets so placed as to permit the excess lubricant to flow away back directly into the pool of oil 9, from which it may be again circulated through the circulating system.

From the foregoing it will be evident that the chain will be thoroughly lubricated by a portion only of the lubricant which is circulated through the system and that the volume of lubricant may be sufficiently large to guarantee an ample supply to the carrier at all times. By this method there is much less likelihood of the circulating system becoming plugged than if only the small amount of lubricant necessary to lubricate the chain were circulated. Also by providing the outlets from the receiver at different levels a further safety measure is provided which adds to the reliability of the system.

While I have shown and described a specified pump for circulating the lubricant, I wish it to be understood that other forms of pump may be substituted, and while the pump has been shown and described as located inside the casing it is within the purview of my invention to have the pump located at any convenient point and driven by any suitable and convenient means, it being understood that I have illustrated what I consider to be the best embodiment of my invention but am by no means limited to the details shown and described.

I claim:

1. The combination of a chain sprockets for said chain, a casing enclosing said chain and sprockets and in which casing there is provided a chamber for holding a pool of liquid, means above a portion of the chain for receiving lubricant, a pump communicating with said chamber and delivering lubricant to said receiving means and means for delivering a portion only of said lubricant from different levels in said receiver to said chain.

2. The combination of a chain, sprockets for said chain, a casing enclosing said chain and sprockets and in which casing there is provided a chamber for holding a pool of liquid, means above a portion of the chain for receiving lubricant, a pump communicating with said chamber and delivering lubricant to said receiving means, means for delivering a portion only of said lubricant from different levels in said receiver to said chain, and means for returning the remainder of the lubricant to the pool.

3. In a lubricating device, a casing having a moving part of substantial width therein, means for maintaining a pool of lubricant in said casing below said part, a reservoir disposed above said part and extending transversely thereof, discharge outlets from said reservoir spaced apart above said moving part, whereby lubricant may drop from said outlet onto said moving part, some of said discharge outlets being at a higher level than others, and an overflow outlet at a higher level than any of said discharge outlets and so disposed that lubricant may drop therefrom to said pool without contacting with said moving part.

4. In a lubricating device, a moving part to be lubricated, a reservoir disposed above said part, means for supplying lubricant to said reservoir, discharge outlets from said reservoir disposed at different elevations but each so placed as to discharge lubricant upon said part, and an overflow outlet at a higher level than any of said discharge outlets and so disposed as to discharge lubricant out of contact with said part.

5. In a lubricating device, a casing having a moving part therein, means for maintaining a pool of lubricant in said casing below said part, a trough extending over said part and to one side thereof, and means for lifting lubricant to said trough from said pool, said trough having discharge openings therein disposed above the bottom thereof and spaced apart over said moving part and also having another discharge opening at a higher level than the first-named openings but below the top of the trough and at one side of said moving part, whereby lubricant discharged from said last-named opening will not drop on said moving part.

JOHN C. CHAPMAN.